3,755,560
NONGREASY COSMETIC LOTIONS

Yancy J. Dickert, Bruce P. Thill, and Alfred F. Steinhauer, Midland, Mich., assignors to The Dow Chemical Company, Midland, Mich.
No Drawing. Continuation-in-part of abandoned application Ser. No. 873,081, Oct. 31, 1969. This application June 30, 1971, Ser. No. 158,559
Int. Cl. A61k 7/00, 9/06; A61l 23/00
U.S. Cl. 424—78                                       9 Claims

ABSTRACT OF THE DISCLOSURE

Aqueous based cosmetic lotions for skin care and skin protection may be formulated to contain high levels of an oily effect agent, such as an emollient, without imparting a greasy or oily feel to the touch after applying and drying same by the inclusion in the lotion of an emulsion (latex) of a water insoluble, organo soluble, film-forming vinyl polymer and a cosmetically suitable emulsifying agent. The effect agent must be a non-solvent and a non-plasticizer for the vinyl polymer. Certain desirable ingredients such as humectants, thickeners, etc. may be optionally added to the lotion.

CROSS REFERENCE

This application is a continuation-in-part of copending application Ser. No. 873,081 filed on Oct. 31, 1969, and now abandoned.

BACKGROUND OF THE INVENTION

This invention relates to hand lotions and like products and particularly to formulations which after application to the skin do not have a greasy or oily feel to the touch.

Skin care products such as emollient or hand lotions have been marketed for many years. Over the years many new compounds and materials have been found suitable for inclusion in such lotions, but with each new material added there are new problems in formulating a satisfactory product. In spite of all the scientific studies which have been made, the formulator of a satisfactory product and particularly of a commercially acceptable product, is still guided as much by "know-how" and experience as he is by scientific principles, since the acceptability and saleability of such products is greatly dependent on aesthetic or certain subjective factors which are difficult to quantify. As a result one formulation which may differ only slightly in choice or proportions of ingredients compared to another, may in the marketplace, be aesthetically as different as night and day even though the two formulations may be quite similar on a casual inspection.

Many of the useful components in skin care products are oily or greasy in nature, for example certain emollients such as lanolin or isopropyl palmitate are prized ingredients but oily in nature. Frequently for functional reasons it would be desirable to increase the concentration of emollients in a skin care formulation but the increased greasiness or oiliness greatly diminishes the product acceptabiltiy.

Thickening agents have also been found useful in formulations of this type and include such materials as water solutions of vegetable gums, cellulose derivatives and synthetic polymers. When pigmented products such as eye or body makeup are prepared polymers may be used as binders for the pigment. Heinrich et al. in British 1,110,-240 propose to prepare liquid makeup lotions which are rub-proof, etc. by the addition of an emulsion polymer. This is analogous to the function of the polymer as a pigment binder in a latex paint except the total solids level is more dilute than in a paint.

U.S. 3,100,180 proposes to employ certain fluorine containing elastomers in dermal protective lotions where the elastomer results in a firmly adherent barrier film which is resistant to oils and common organic solvents. This film cannot be readily removed by washing with soap and water which greatly limits its cosmetic suitability and appeal.

SUMMARY OF THE INVENTION

Accordingly it has now been discovered that cosmetic formulations for skin care and skin protection may be formulated to contain high levels of normally greasy or oily effect agents with the addition thereto of an emulsion of a water insoluble, organo soluble film-forming vinyl polymer (latex) without the formulation feeling greasy or oily to the touch nor tacky after applying and drying same on the skin. Additionally the formulations of this invention have the desirable property of being readily removed by washing with soap and water.

The benefits and advantages of this invention are obtained by preparing an aqueous based lotion consisting essentially of from about 0.5 to about 8 weight percent of said vinyl polymer solids, from about 1 to 20 weight percent of an oil soluble effect agent which is a non-solvent and a non-plasticizer for said polymer, from about 2 to 10 weight percent of a compatible, cosmetically suitable emulsifying agent with the balance of the formulation to make 100% of water. The weight ratio of the effect agent to the vinyl polymer in the formulation ranges from about 2:1 to 20:1. For heavier lotions or creams higher proportions of effect agents (emollients) up to 30 percent may be employed. Several optional ingredients such as humectants, thickeners and the like add desirable properties to the lotions.

DETAILED DESCRIPTION OF THE INVENTION

Adavantageously this invention provides the cosmetic formulator a means to greatly expand the range and kind of effect agents as well as the proportions thereof in a variety of cosmetic lotions for skin care and protection without diminishing the aesthetic properties thereof by adding to the lotions the previously described proportions of the vinyl polymers emulsion (latex). The effect of the emulsion polymer is to permit such formulations to be prepared without the oily or greasy effect after applying and drying the lotion. This effect of the emulsion polymer on the dry characteristics of the lotion was quite unexpected in the absence of any pigments or other inert solids in the formulation and also in view of the low polymer concentration in the formulation.

The benefits and advantages of this invention may be found with a wide variety of cosmetic formulations designed for skin care and skin protection. The prevention or relief of dryness of the skin with emollient or hand lotions is an important area. Dryness or "chapping" of the skin results when there is insufficient hydration from lower epidermal areas or an excessive loss of water from exposure of the skin to low humidities or both. Heavy or continuous use of soaps, etc. contribute to a dry skin condition by removal of the protective lipid layer which provides "slip" and flexibility as well as retards the transpiration of moisture.

Lotions containing emollients are used to prevent or care for a dry skin condition. However, emollients are oily or greasy materials and their application to the skin leaves a greasy or oily feel, which of course is more pronounced the larger the proportion or amount of the emollient used. This invention permits the application of lotions containing relatively large amounts of emollients which rapidly rehydrate skin but which feel dry to the touch and not oily or greasy. Hand lotions containing a variety of medicants in addition to emollients may also be formulated according to this invention. Other skin care products may be prepared which replace part or all of the emollient with sunscreen agents, analgesic agents, insect repellants and the like. Many other useful lotions will be apparent to the formulator of such cosmetic products.

The cosmetic lotion formulations of this invention have the further desirable property of being readily removable by washing with soap and water. By readily removable it is meant that the lotion, after application, may be substantially removed by the ordinary day-to-day cleansing process of lathering with soap and washing or showering.

One of the essential components of the cosmetic lotions of this invention is an emulsion or aqueous dispersion of a water insoluble, organo soluble, film-forming vinyl polymer. The emulsion is also commonly known as a latex. The lotion is formulated to contain from about 0.5 to 8 weight percent of said vinyl polymer solids. Since the lotions are designed for topical application to the skin the vinyl polymer should also be non-toxic, but this presents no problems with most emulsion polymers.

By film forming it is meant the ability of the vinyl polymer to form a continuous solid film by air drying of a deposited coating. In general film-formability is enhanced by a number of factors such as particle size which normally ranges from about 300 to about 2000 angstrom units. Additionally, the latex must be predominantly in the amorphous state. It is well known that such amorphous polymers may be prepared even from polymers which normally are considered to be crystalline. By organo soluble it is meant that the vinyl polymer is soluble in a common organic solvent such as an aromatic solvent, e.g. xylene, toluene, etc., a ketone, e.g. acetone, methyl ethyl ketone, and the like.

The vinyl emulsion polymer may be prepared from a variety of well known monomers and mixtures of monomers. It is understood that the term, vinyl emulsion polymer, includes homopolymers and polymers prepared from two or more monomers. Examples of monomers which may be employed are esters of vinyl carboxylic acids such as the alkyl acrylate and methacrylate esters, especially alkyl methacrylates having from 1 to about 4 carbons in the alkyl group and alkyl acrylates having from 1 to about 18, preferably 1 to about 12, carbons in the alkyl group; vinyl carboxylic acids such as acrylic acid, methacrylic acid, itaconic acid and the like; vinyl chloride and vinylidene chloride; conjugated olefins such as butadiene, isoprene and the like; nitrile monomers such as acrylonitrile and methacrylonitrile; alkenyl aromatics such as styrene, vinyl toluene and the like; and vinyl esters such as vinyl acetate and the like. Generally the vinyl emulsion polymer is prepared from two or more monomers.

Typical of the many vinyl emulsion polymers are polyvinyl chloride, polyvinyl acetate, copolymers of styrene and butadiene, copolymers of vinylidene chloride and vinyl chloride, copolymers of vinylidene chloride and acrylonitrile, a terpolymer of vinylidene chloride, acrylonitrile and butyl acrylate, a terpolymer of styrene, butadiene and itaconic acid, and an interpolymer of methyl acrylate, ethyl acrylate, methyl methacrylate and methacrylic acid.

A preferred group of vinyl emulsion polymers are those which are prepared from a mixture of monomers, one of which is a vinyl carboxylic acid monomer. The presence of the carboxylic acid improves the removability of the lotion by washing with soap and water. The amount of the acid monomer can vary considerably depending on the other monomers employed but even quite small amounts are effective.

The latex may be prepared by any of the known procedures for polymerization in aqueous emulsion. Typically the monomer is added to an aqueous solution of a polymerization catalyst such as potassium persulfate or hydrogen peroxide and a surface active agent capable of emulsifying the monomers. Many suitable surface active agents are known to the art. The polymerizable mixture is agitated to effect emulsification and polymerization is initiated by heating the emulsified mixture usually between 35° and 100° C. The surface active agent is usually employed in an amount corresponding to from 0.5 to 5 percent of the weight of the polymerizable organic compounds. The polymerization catalyst is usually added in an amount corresponding to from 0.5 to 5 percent of the monomers.

A particular feature of this invention is that the use of the latex polymer permits formulations to contain high levels of oily effect agents without imparting an oily feel to the skin. The amount of said effect agent or mixtures of same may vary from about 1 to about 20 weight percent for light lotions and up to 30 percent or even higher for heavy lotions and creams. Preferably, however, the proportions of said effect agent are adjusted in relation to the amount of emulsion polymer solids. This weight ratio of effect agent to polymer solids preferably varies from about 2:1 to 20:1.

The effect agent is an oily material which is essentially neither a solvent nor a plasticizer for the vinyl emulsion polymer, however a slight amount of plasticization or solvency may be tolerated without detracting from the beneficial results of this invention. By an oily effect agent it is meant to include agents which are oils or a solution of an effect agent in an oil such as mineral oil, for example.

A variety of said effect agents are known and available to the cosmetic formulator. Especially valuable are the emollients which include wax esters such as lanoline, spermaceti and the like; steroid alcohols such as cholesterol and lanolin alcohols; fatty alcohols such as stearyl, cetyl, etc.; triglyceride esters (animal and vegetable oils); phospholipids such as lecithin and cephalin; fatty alcohol ethers and esters; hydrocarbon oils and waxes; ethoxylated lanolin or beeswax derivatives; and silicone oils. (See Cosmetics Science and Technology, E. Sagarin, Interscience Publishers, Inc., New York, 1957 at page 102, for example.)

In addition to emollients other effect agents include bactericidal agents, topical analgesics, sunscreen agents, artificially tanning agents, insect repellants and the like. It should be understood that the invention contemplates the use of more than one effect agent in a single formulation, for example, an insect repellant in combination with a sunscreen agent. It should also be understood that an oil soluble effect agent may be dissolved and used in an "inert" oil.

Essential to the preparation of a stable lotion is the addition of about 2 to 10 weight percent of an emulsifying agent. Generally, the emulsifiers may be classed as anionic, cationic or nonionic and are selected partly on this basis for compatibility with the other ingredients of the formulation. In addition to compatibility the emulsifier is selected for its cosmetic suitability and aesthetic properties, i.e. non-toxic, non-irritating, and the absence of other factors such as odor, color, etc. which might be unpleasant or difficult to mask in the formulation. As pointed out in said textbook reference (p. 104) emulsifiers are important to the cosmetic elegance of present day products.

These criteria for suitable emulsifiers do not greatly limit the choice of emulsifiers since the cosmetic art uses a great variety of same. In the area of anionic emulsifiers are the fatty acid soaps or mixtures of same with fatty acid esters such as glyceryl monostearate, sodium salts of sulfuric esters and the like. Cationic agents are not too widely used but may be used both for their emulsification properties as well as other properties such as germicidal or substantive effects. Typical cationics are cetyl pyridinium chloride and alkyl dimethyl benzyl ammonium chloride. The nonionics are widely used because of their compatibility features as well as emulsification effectiveness. Examples of nonionics are polyoxyethylene fatty alcohol ethers and esters, ethoxylated sorbitan fatty acid esters, polyol fatty acid esters and the like. While many of these nonionics may also impart some emollient properties they are primarily considered to be emulsifying agents. Said textbook reference cited previously can be consulted for additional suitable emulsifiers. The balance of the formulation to make 100% consists essentially of water.

A number of optional ingredients may also be included in the formulation of this invention. Particularly desirable are humectants which principally include polyhydric alcohols and especially include glycerol, propylene glycol and sorbitol. The proportions of humectant range from about 0.5 to 4 weight percent. Another valuable ingredient is a thickening agent which may be either inorganic or organic. Organic thickeners and/or stabilizing agents are usually polymeric in nature and are water soluble compounds. The amount of said water soluble polymeric compound varies from about 0.1 to 2.0 weight percent. Other optional ingredients include preservatives, perfumes, colorants if other than a white lotion is desired, small amounts of alcohols, and the like. Inorganic and organic bases are frequently used to neutralize certain of the ingredients, form a fatty acid soap in situ, etc. Sodium hydroxide, potassium hydroxide and triethanol amine are commonly used.

Conventional oil-in-water emulsion techniques may be used to prepare the formulations of this invention. Such techniques utilize sufficient shear in the mixing of ingredients to obtain a stable, homogeneous emulsion. The oil phase and the water phase advantageously may be preheated prior to mixing together to aid in forming the emulsion. When preheating is used the emulsion polymer is usually added to the emulsion after it has cooled. Those latexes which are not sensitive to heating may, of course, be present during the preheat stage.

The following non-limiting examples are presented to further illustrate this invention.

Example 1

(A) A hand lotion was prepared by first preheating an oil phase containing palmitic acid, stearic acid, isopropyl palmitate and cetyl alcohol to a temperature between 60 and 70° C. A water phase containing propylene glycol and triethanolamine was also heated to about the same temperature and then added to the oil phase with sufficient stirring to form a smooth emulsion. This hand lotion contained the following ingredients:

| Ingredient | Wt. percent |
|---|---|
| Palmitic acid | 1.5 |
| Stearic acid | 1.5 |
| Isopropyl palmitate | 5 |
| Cetyl alcohol | 1 |
| Propylene glycol | 5 |
| Triethanol amine | 1.3 |
| Water, balance to 100%. | |

The hand lotion when applied to the skin had a decided oily or greasy residual feel.

(B) A similar formulation was prepared except that the emulsion contained 5 weight percent of a pigment and 15 percent of Veegum T (a 5% by weight solution of a silicate dispersant). The pigment was composed of 15% talc and 85% titanium dioxide. This formulation when applied to the skin has a non-oily residual feel, however, it does not prevent the pigment from rubbing off onto clothing.

(C) The pigment may be prevented from rubbing off by adding to the above pigmented formulation about 3.5 weight percent (polymer solids) of a latex as a binder for the pigments and the non-oily residual feel is maintained.

(D) It was found that this non-oily residual feel is obtained when the acrylic latex polymer is present even when the pigments (and dispersant), which were previously shown to have a drying effect on the hand lotion, were omitted. A formulation was prepared as in part A above which contained the following ingredients:

| Ingredient: | Wt. percent |
|---|---|
| Palmitic acid | 1.5 |
| Stearic acid | 1.5 |
| Isopropyl palmitate | 5 |
| Cetyl alcohol | 1 |
| Propylene glycol | 5 |
| Triethanol amine | 1.3 |
| Acrylic latex polymer solids | 3.5 |
| Water, balance to 100%. | |

This hand location on application to the skin, rubbing and drying had a pleasant non-oily residual feel. These results are even more unexpected when it is considered that the formulation only contains about 3.5% polymer solids and the ratio of oils to polymer is about 9:3.5 (including the fatty acids) or 6:3.5 (excluding said acids).

(E) The acrylic latex polymer employed in parts (C) and (D) above was prepared by a standard emulsion polymerization technique. A charge of 40 grams of mixed monomers consisting of 35 parts of methyl acrylate, 20 parts of ethyl acrylate, 20 parts of methyl methacrylate, and 25 parts of methacrylic acid was added to 775 g. of water and 7.8 g. of 30.8% Dupanol WAQE in a 2 liter flask equipped with a nitrogen purge, a reflux condenser, and a stirrer. This mixture was heated to 70° C. at which point a solution containing 4 g. of $Na_2S_2O_8$ in 25 ml. of $H_2O$ was added and the heat was removed. The temperature of the reaction increased to 75° C. and then subsided. An additional 360 grams of the mixed monomers was then pumped into the flask at the rate of 90 g. per hour while maintaining a temperature of 70° C. After 4 hours the monomer was all in and the reaction was heated for an additional hour at 70° C. and then heated at 90–95° C. for 2 hours to remove traces of the monomer. The latex solution was cooled and filtered and contained about 33 weight percent of vinyl polymer solids.

Example 2

A hand lotion with excellent skin conditioning properties and aesthetic properties was formulated to contain the following ingredients:

| Weight percent | Ingredient | Primary function |
|---|---|---|
| 5 | Isopropyl palmitate | Emollient. |
| 1.0 | Cetyl alcohol | Do. |
| 1.5 | Lanolin (anhydrous) | Do. |
| 0.3 | Water soluble silicone fluid (DC 473) | Do. |
| 1.0 | Stearic acid | Emulsifier. |
| 2.5 | Glyceryl monostearate | Do. |
| 2.5 | Polyethylene glycol 400 distearate (Pegosperse 400 DS). | Do. |
| 2.5 | Glycerine | Humectant. |
| 2.0 | Acrylic latex polymer solids | |
| 0.2 | Carbopol 940 solids [1] | Thickener. |
| 0.4 | Triethanol amine | Neutralizing agent. |
| Balance to 100%. | Water | |

[1] Added as a 5% solids solution; Carbopol 940 is reported to be a lightly crosslinked polyacrylic acid (B. F. Goodrich).

This formulation also contained preservatives, a perfume and a yellow colorant. An application to the skin of this lotion imparts a pleasant, non-oily residual feel.

Example 3

Similar results to the previous examples were obtained when the acrylic latex was replaced on an equivalent solids basis with any of the following latexes:

(a) A commercially available polyvinyl acetate latex (Elvacet 1423).

(b) A commercially available latex containing about 63% butyl acrylate, 34% acrylonitrile and 3% methacrylic acid.

(c) A saran latex containing about 90% vinylidene chloride, 5% acrylonitrile and 5% butyl acrylate.

(d) Several acrylic latexes of the following compositions.

| | Weight percent | | | | |
|---|---|---|---|---|---|
| | MA | EA | MMA | MAA | Other |
| I | 30 | 35 | 10 | 15 | 10 (styrene). |
| II | 40 | 35 | 10 | 15 | |
| III | 40 | 35 | | 15 | 10 (t-butyl styrene). |
| IV | 40 | 25 | | 15 | 20 (styrene). |

NOTE.—MA=Methyl acrylate; EA=Ethylacrylate; MMA=Methyl methacrylate; MAA=Methacrylic acid.

Example 4

A hand lotion which contained no humectant but which was effective as a moisturizing hand lotion and had a non-oily residual feel was formulated to contain the following:

Ingredient: Wt. percent
- Glyceryl monolaurate _____ 1.5
- Glyceryl monostearate _____ 1.5
- Cetyl alcohol _____ 1.0
- Isopropyl palmitate _____ 5.0
- Stearic acid _____ 1.5
- Carbopol 940 solids _____ 0.1
- Acrylic latex polymer solids _____ 3.0
- Triethanol amine _____ 0.2
- Silicone fluid (DC 473) _____ 0.3
- Water, balance to 100%.

The acrylic latex polymer similar to Example 1 was used. Similar results are obtained if the amount of the latex polymer solids is less by one-half the amount above.

Example 5

As indicated previously products which might appear to be quite similar may actually be very different from the standpoint of customer acceptance and aesthetic features. The aesthetic as well as performance characteristics of a hand lotion similar to that of Example 2 was determined in a large sample test against the largest selling commercial hand location.

The test was conducted with 800 persons, 400 of whom where supplied a sample of the commercial lotion (unidentified) and 400 given the above hand lotion and were asked to evaluate the products against their previous experience with hand lotions. Tests were made nationwide but the largest portions were located in dry regions of the country.

A brief summary of all the results showed that, overall, 35% of the respondents who tested the hand lotion of this invention rated it better than the hand lotion they normally used; 22% of those who tested the commercial lotion rated it better than the lotion they normally used. On a similar comparative rating basis the respondents evaluated the hand lotion of this invention and the commercial product on the following characteristics:

| | Percent of— | |
|---|---|---|
| | (1) | (2) |
| Adds rich moisturizing ingredients to the skin | 48 | 28 |
| Relieves skin dryness and flaking | 41 | 30 |
| Replaces natural skin oils | 31 | 21 |
| Penetrates deeply | 44 | 30 |
| Softens and smoothes the skin | 42 | 30 |
| Feels soft and creamy when applied | 43 | 24 |
| Doesn't leave hands greasy or sticky | 38 | 33 |

NOTE.—(1) Hand lotion of this invention; (2) Commercial hand lotions.

The acceptability of the lotion of this invention on both an aesthetic and performance basis is clearly evident. The value of the latex polymer in providing a non-oily residual feel is shown by the fact that the lotion tested contained a larger quantity of oils, etc. than the commercial lotion.

Another factor of importance to cosmetic lotions of the type described and claimed herein is removability by washing with soap and water. This is in contrast to certain special preparations which are designed to protect the skin against all manner of materials such as greases, solvents of all kinds, detergents and the like. Such preparations are known as barrier creams or lotions and are designed to produce a highly adherent barrier film on the skin.

The following tests show the differences between the lotions of this invention and a barrier film type lotion such as is described in U.S. 3,100,180 where a special fluorinated elastomer is employed to form the barrier film. The various examples in this patent show that the barrier film is highly resistant to common organo solvents, various oily materials and is resistant to removal by repeated washing with soap and water.

Example 6

Employing the acrylic latex polymer of the previous examples a lotion was prepared according to Example 1 of U.S. 3,100,180. The lotion was prepared by adding 2.75 gm. of said latex (about 33% solids) to 30.25 gms. of hot water and warmed to 65° C. Then 5 gms. of USP stearic acid was melted and added with good stirring. The mixture was kept at 50–65° C. and sufficient $K_2CO_3$ was added to adjust the pH to 6.0. Then 12 gms. of hot melted polyethylene glycol 600 monostearate was added with good mixing. In about 10 minutes the emulsion became thick and creamy.

A small amount of the formulation was spread over about a ten square inch area of the forearm and dried for 10–15 minutes. Then half of the treated area was washed with soap and water. Small drops of a 1% solution of Sudan II (a red dyestuff which strongly stains the skin) in a mixture of heptane and xylene were placed on the unwashed and on the washed areas. After about one minute the dyed areas were rubbed briskly with a facial tissue. Almost all the color was removed from the unwashed-treated area whereas the washed-treated area still showed marked staining indicating the lotion had been removed from the skin by washing with soap and water.

Similar results were found when the acrylic latex was replaced by the saran latex of the polyvinyl acetate latex of Example 3.

A formulation similar to that of Example 2 was prepared and tested as above with the same results, i.e. the lotion was readily removed by washing with soap and water. In like manner additional formulations were prepared by replacing the acrylic latex with the saran latex or polyvinyl acetate latex, as above. Again the lotions were found to be removable by washing with soap and water.

The solvent solubility of films of the three latexes employed above were also tested. After casting and forming films by drying of each of the latexes employed above, the solubility was tested by placing drops of xylene and methyl ethyl ketone on each of the films. All three films readily dissolved in methyl ethyl ketone. Xylene dissolved the polyvinyl acetate film, softened the saran film but did not affect the acrylic film. Thus the films of the above latexes are soluble in a common organo solvent.

What is claimed is:

1. A cosmetic lotion having improved holding capacity for an oily effect agent which upon drying is non-tacky and nongreasy to the touch, said lotion consisting essentially of a polymeric dispersion containing.
   (a) from about 0.5 to 8 weight percent of a predominantly amorphous water insoluble, organo soluble, film-forming vinyl polymer;
   (b) from about 1 to 30 weight percent of an oily effect agent which is a non-solvent and a non-plasticizer for said polymer wherein the weight ratio of said effect agent to said polymer varies from about 2:1 to 20:1;
   (c) from about 2 to 10 weight percent of a compatible, cosmetically suitable cationic, anionic or nonionic emulsifying agent; and
   (d) water, to make 100 percent.

2. The lotion of claim 1 further containing from about 0.5 to 4 weight percent of a humectant.

3. The lotion of claim 1 further containing from about 0.1 to 2 weight percent of a thickening agent.

4. The lotion of claim 1 wherein said effect agent is an emollient or mixtures thereof.

5. The lotion of claim 1 wherein the effect agent concentration ranges from about 1 to 20 weight percent.

6. The lotion of claim 1 wherein said vinyl polymer is a polymer of a vinyl carboxylic acid, an alkyl methacrylate having from 1 to about 4 carbons in the alkyl group and an alkyl acrylate having from 1 to about 12 carbon atoms in the alkyl groups.

7. The lotion of claim 6 wherein said vinyl polymer is a polymer of methyl methacrylate, methyl acrylate, ethyl acrylate and methacrylic acid.

8. The lotion of claim 1 wherein said vinyl polymer is prepared from a mixture of monomers one of which is a vinyl carboxylic monomer.

9. The lotion of claim 4 further containing a sun screen agent.

References Cited

UNITED STATES PATENTS

| | | | |
|---|---|---|---|
| 3,100,180 | 8/1963 | Smith et al. | 424—78 |
| 3,406,238 | 10/1968 | Freyermuth et al. | 424—70 |
| 3,301,830 | 1/1967 | Nelson et al. | 424—78 |
| 3,608,070 | 9/1971 | Nouvel | 424—78 |

SAM ROSEN, Primary Examiner

U.S. Cl. X.R.

424—59, 60, 81